March 1, 1966  R. E. KELSO  3,237,291
UNIVERSAL JOINT ASSEMBLY AND DISASSEMBLY TOOL
Filed March 21, 1963  2 Sheets-Sheet 1
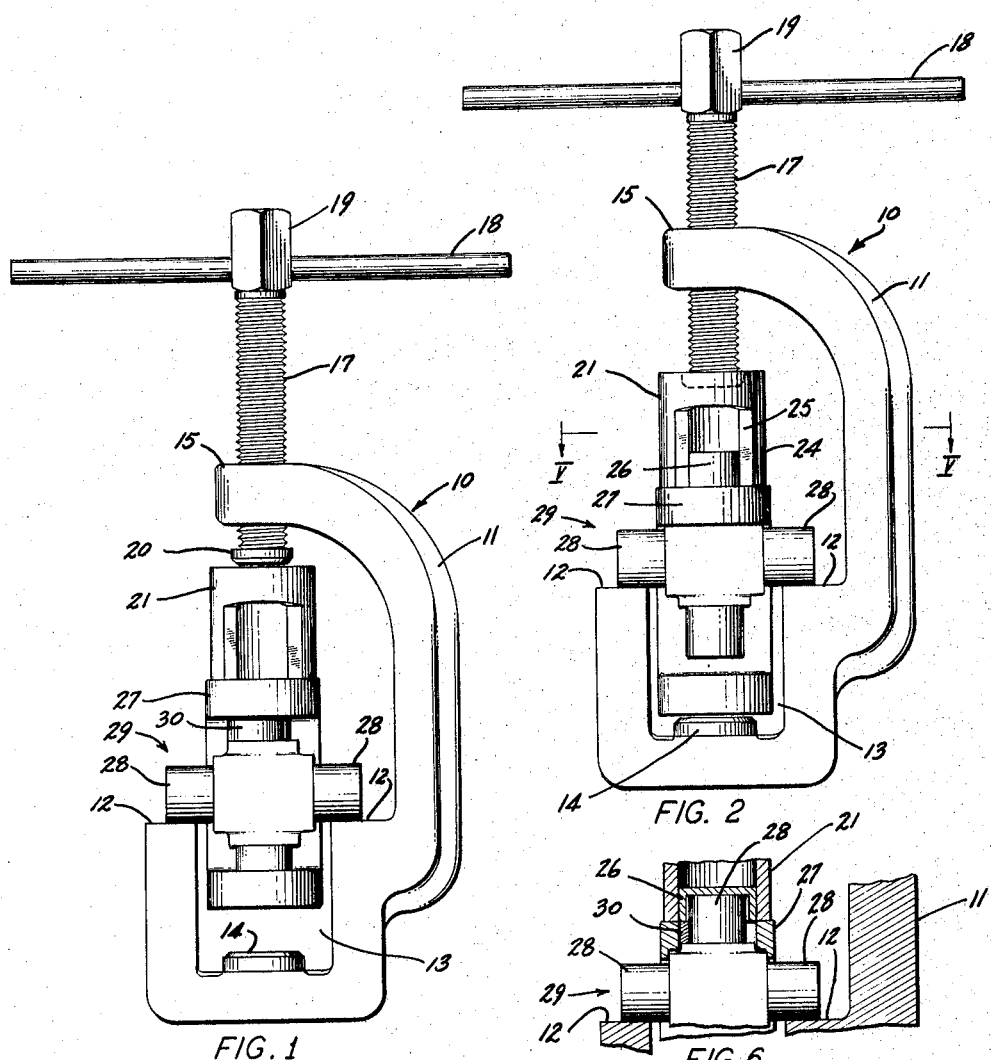
INVENTOR
ROBERT E. KELSO
BY Roy A. Plant
ATTORNEY March 1, 1966  R. E. KELSO  3,237,291
UNIVERSAL JOINT ASSEMBLY AND DISASSEMBLY TOOL
Filed March 21, 1963  2 Sheets-Sheet 2
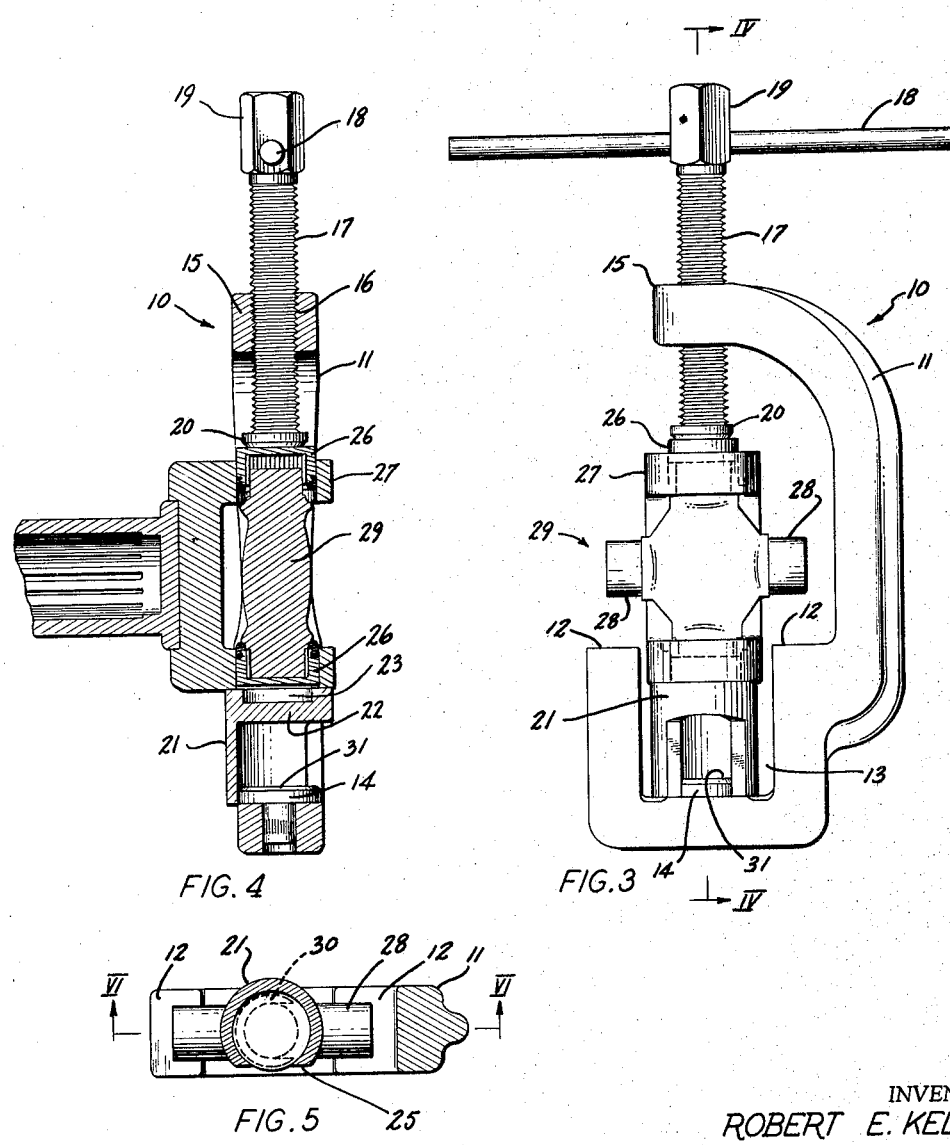
INVENTOR
ROBERT E. KELSO
BY Roy A. Plant
ATTORNEY United States Patent Office 3,237,291
Patented Mar. 1, 1966

3,237,291
UNIVERSAL JOINT ASSEMBLY AND
DISASSEMBLY TOOL
Robert E. Kelso, Jackson, Mich., assignor to Dowley
Manufacturing, Inc., Spring Arbor, Mich., a corporation of Michigan
Filed Mar. 21, 1963, Ser. No. 267,001
2 Claims. (Cl. 29—257)

The present invention relates broadly to tools, and in its specific phases to a tool for dismantling and reassembling universal joints.

In the past the conventional procedures for repairing, or greasing universal joints, such as used for instance on automobile drive shafts, has been to grip them in a vise or even place them on a suitable anvil and then pound them with a hammer to drive the universal joint cross member sidewise so that the universal joint can be taken apart in order that the bearings can be either replaced, repaired, or repacked with grease. This practice has sometimes led to damaging the universal joint, or its bearings, as well as permitting part of the bearings to drop onto the work bench or floor with the nuisance of having to pick them up and clean them before examination and reassembly of the universal joint after repairing and/or greasing same. It was a recognition of this unsatisfactory practice and the need of a new way to do this universal joint repair and regreasing work, which led to the conception and development of the present invention.

Accordingly, among the objects of the present invention is to provide a universal joint assembly and disassembly tool which has an adapter to receive the bearings from the shaft ends of the universal joint cross member.

Another object of the present invention is to provide a universal joint disassembly and reassembly tool which utilizes a steady or intermittent pushing force in the servicing of universal joints.

Another object of the present invention is to provide a highly simplified tool for servicing universal joints wherein each universal joint bearing can be removed in one simple operation.

A further object of the present invention is to make fast servicing of universal joints possible.

A further object of the present invention is to make possible the servicing of universal joints directly on the automobile without removal of the universal joint, where clearance will permit same.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means and modes of carrying out the invention, such disclosed means and modes illustrating, however, but one of the various ways in which the principle of the invention may be used.

In the annexed drawings:

FIGURE 1 is a side view of the universal joint servicing tool of the present invention with one yoke of the universal joint shown in disassembly position and with the other yoke omitted to facilitate showing the tool in position to start the removal of one of the universal joint bearings.

FIGURE 2 is similar to FIGURE 1 but showing the top bearing forced out of the universal joint yoke.

FIGURE 3 is a side view of the universal joint servicing tool of the present invention with one yoke of the universal joint shown in reassembly position and with the other yoke omitted to facilitate showing the tool with the pressing of a bearing into the top of the yoke having been started.

FIGURE 4 is a longitudinal sectional view of the universal joint servicing tool as seen along line IV—IV of FIGURE 3, looking in the direction of the arrows.

FIGURE 5 is a cross sectional view as seen along line V—V of FIGURE 2, looking in the direction of the arrows.

FIGURE 6 is a cross sectional view as seen along line VI—VI of FIGURE 5, looking in the direction of the arrows.

Referring more particularly to FIGURES 1 and 2 of the drawings it will be noted that the universal joint servicing tool 10 has a body member 11 with a pair of parallel rails or anvils 12 of substantially the same top surface height. Between these anvils 12 there is a relatively deep recess 13, to facilitate servicing the universal joint, with the bottom of this recess being substantially in a plane parallel to one including the top faces of said anvils 12. At the bottom of recess 13 there is a locating pin 14, the use of which will be hereinafter set forth.

The upper end 15 of body member 11 extends over the anvils 12 and is spaced well above and substantially parallel to same so as to permit the universal joint to be mounted on the universal joint servicing tool beneath said upper end 15. This upper end 15 is provided with threads 16, FIGURE 4, for the reception of a forcing screw 17 substantially centrally alined vertically above locating pin 14, FIGURE 1, and substantially perpendicular to the plane containing the top faces of anvils 12, so that as said forcing screw 17 is threadedly moved endwise it will move in a direction to or from said locating pin 14. The upper end of the forcing screw 17 is preferably provided with a T-handle 18 for use in rotating forcing screw 17 and preferably the upper end of such screw is also provided with a wrench engaging surface 19 so that a wrench (not shown) can be used if necessary to supplement the use of T-handle 18 under conditions of use of the tool. The forcing screw 17 is also provided with a head member 20 which can be anchored on the end of forcing screw 17 in any conventional manner after the forcing screw 17 has been threadedly engaged with the upper end 15 of the body member 11 of the tool 10. This head member 20 is preferably anchored on the end of forcing screw 17 so as to be rotatable thereon under conditions of use.

An adapter 21 having a closed head portion 22, FIGURE 4, and a recess 23 adjacent same for the reception of head member 20, FIGURES 1 and 2, and a skirt 24 with an open end opposite to said closed head portion 22, said skirt having a substantially uniform diameter bore as shown and preferably having an open side 25, for visual examination of the removal or reinstallation of the bearing 26, is used both for removing universal joint bearings as well as reinstalling same in a universal joint yoke 27. The skirt 24 has an inside diameter just slightly larger than the diameter of the universal joint bearings 26 so that the latter can be forced up into the open end of same as shown in FIGURE 2 when the bearings are being removed from the universal joint yoke 27. Also, when the bearings are to be reinstalled, this adapter 21 is placed between anvils 12 and wherein the locating pin 14 is of a size to slip into this open end of the skirt 24 and center same as shown in FIGURES 3 and 4.

A universal joint, such as used on an automobile, has two yokes 27 with each end of each yoke carrying a bearing 26. These bearings are of a suitable inside diameter to receive a shaft end 28 of a universal joint cross member 29, and it is these bearings 26 which must be periodically removed and greased or repaired in case they become badly worn or damaged in some manner. The removal of these bearings and the replacement of same after greasing or repairing involves the problem which the present invention has been devised to solve.

Each of the four universal joint bearings 26 in a complete universal joint are held in place by means of so-called "lock rings" (not shown), or the equivalent, and which prevent the bearings from coming out of the universal joint under conditions of use. Such "lock rings," of course, have to be removed before removing the bearings 26, and are reinstalled after the bearings have been replaced in the universal joint yoke. The removal of one of these bearings 26 from a universal joint will now be described with particular reference to the showing in FIGURES 1 and 2 of the drawings. Here, for clarity of showing and explaining the operation of the tool, one of the yokes of the universal joint has been removed in the manner hereinafter described and under such conditions the shaft ends 28 of the universal joint cross member 29 rest directly on the anvils 12 instead of the side edges of the first universal joint yoke prior to its removal. This, however, does not change the operation of the tool at all and it can be considered that the tool has been used to remove the bearings in the missing yoke member and that the latter has been thus disconnected and removed leaving the second yoke member to have its bearings removed and at which point FIGURES 1 and 2 of the drawings describe same.

Referring now to FIGURE 1 wherein the universal joint cross member 29 has already had one of the universal joint yokes removed, the other universal joint yoke is placed in up and down position as shown and with the exposed shaft ends 28 of the universal joint cross member 29 resting on the parallel anvils 12. The adapter 21 is then placed with the open end of its skirt 24 fitting concentrically around the upper universal joint bearing 26 with the open lower end of the adapter 21 resting against the top face of the universal joint yoke 27. The head member 20 of the forcing screw 17 is then extended down into recess 23 of the adapter 21, as shown in FIGURE 2, by rotating the forcing screw 17 to move same downward. Further rotation of this screw 17 then forces universal joint yoke 27 downward and pushes the upper universal joint bearing 26 up into the hollow portion of the adapter 21 as shown in FIGURE 2.

Sometimes the end of yoke 27 carrying the universal joint bearing 26 is of such a depth or thickness that in moving same to remove the bearing it comes against the universal joint cross member 29 without the bearing 26 coming completely out of the opening in the end of universal joint yoke 27. To take care of this situation, a horseshoe-shaped spacer 30, FIGURES 1, 5 and 6, is inserted between the bottom of the partially removed universal joint bearing 26 and the top of the universal joint cross member 29 after the adapter 21 has been moved upward to permit the installation of the spacer 30. With such spacer in place, the forcing screw 17 is then tightened down again to continue the downward movement of yoke 27 and forcing of the universal joint bearing 26 out of the upper arm of yoke 27 until the bearing 26 reaches the position shown in FIGURE 6, where it is completely released from universal joint yoke 27 and is up into the adapter 21. Under these conditions, the forcing screw 17 can then be moved upward to release adapter 21 so that it can be removed and then the universal joint bearing 26 can be manually lifted off of the shaft end 28 of the universal joint cross member 29. The yoke 27 can then be lifted upward to release the spacer 30 and upon inverting the yoke so that its lower end becomes uppermost, the same procedure can be followed to remove the other universal joint bearing 26 from this same yoke. With the bearings thus removed, they can be repaired if necessary and greased ready for reinstallation in the universal joint yoke.

Referring now more particularly to FIGURES 3 and 4, the reinstallation of universal joint bearings 26 will now be described. First, the adapter 21 with open end down is mounted on locating pin 14 in the recess 13 between anvils 12. This locating pin 14 is of an outside diameter slightly less than the inside diameter of the skirt 24 of adapter 21 so as to facilitate ready mounting of the adapter on said pin. This locating pin 14 is also preferably provided with a chamfer 31 on its edge to facilitate easy mounting of the adapter 21 on the locating pin 14. The bearing 26 at the upper end of universal joint yoke 27 is then put in place with the opposite end of the yoke resting on the top of adapter 21. The application of pressure on the upper universal joint bearing 25 due to rotating forcing screw 17 in a downward direction forces bearing 26 into place in the universal joint yoke with same shown partially driven into final seating position in FIGURE 4. This forcing is continued until the bearing 26 is in place, the same as the lower bearing 26 which had been previously installed in like manner. When the bearings 26 have been installed in both ends of both yokes and anchored with conventional "lock rings," or the like (not shown), the universal joint is again ready for use on an automobile drive shaft or the like in conventional manner.

It is thus to be seen that with the present apparatus the universal joint bearings 26 can be readily removed and readily reinstalled after repairs, greasing or the like and without any of the undesired pounding of same. Moreover, where there is adequate clearance for working on the universal joint connected in place, for instance, on the drive shaft of an automobile, the repairs or greasing can be taken care of without disassembling the drive shaft and universal joints from the machine on which same are installed, all with little danger of damaging the bearings or yoke portions of the universal joint which might readily occur where hammering of same is involved in accordance with past practice. Directional terms such as "upper," "lower," and "vertical," et cetera, have been used as an aid to describing the invention in the position shown in the drawings and are not to be considered as limiting the invention.

Other modes of applying the principle of my invention may be employed instead of the one explained, change being made as regards the means and the method steps herein disclosed, provided those stated by any of the following claims or their equivalent be employed.

I therefore particularly point out and distinctly claim as my invention:

1. A universal joint bearing servicing tool, which comprises a body member, said body member having a pair of spaced apart anvils having a solid portion of said body member connecting them at one end with a deep U-shaped recess between said anvils, providing legs extending upwardly and parallel to each other said body member having an upper end extending over said anvils and spaced from same sufficiently for receiving said universal joint in servicing position therebetween, said upper end having a threaded opening therethrough, a forcing screw threadedly engaging said threaded opening for movement to and from said anvils and substantially aligned with said solid portion, said anvils having faces which are substantially in a common plane perpendicular to the axis of said screw, a hollow adapter having a closed head portion and an open end, the closed head portion of said adapter being engageable with the end of said forcing screw and the open end with said universal joint in position for a universal joint bearing to be forced into said open end ready for servicing, and there being in the bottom of said recess between said anvils and mounted on said solid portion a locating pin substantially parallel with the top of said anvils and of a size to closely but releasably receive the open end of said adapter for centering same closed head portion up between said anvils for supporting said universal joint in position for reinstallation of said universal joint bearing.

2. A universal joint servicing tool to assemble a universal joint having bearing surfaces to mount bearings on its universal joint cross member shaft ends which comprises (a) a body member,
(b) said body member having a pair of spaced apart anvils at one end and connected by a solid portion of said body member,
(c) said body member having an upper end extending over said anvils and spaced from same sufficiently for receiving said universal joint in servicing position therebetween,
(d) said upper end having a threaded opening therethrough,
(e) a locating pin mounted on said solid portion,
(f) a forcing screw threadedly engaging said threaded opening and positioned between said anvils and aligned with said locating pin for movement to and from said locating pin,
(g) said anvils having faces which are substantially in a common plane perpendicular to the axis of said screw,
(h) a hollow adapter having a closed head end and an open lower end, and
(i) the closed end of said adapter supporting said bearing to be assembled on said bearing surface and the open lower end aligned and positioned on said locating pin for the universal joint bearing to be forced onto said bearing surface.

References Cited by the Examiner

UNITED STATES PATENTS

| | | | |
|---|---|---|---|
| 1,373,017 | 3/1921 | Nichols | 29—257 |
| 1,669,899 | 5/1928 | Coffer. | |
| 2,167,897 | 8/1939 | Kulp | 29—257 X |
| 2,477,270 | 7/1949 | Smith | 29—257 |
| 2,549,429 | 4/1951 | Cowles | 29—257 |
| 2,700,208 | 1/1955 | Messimer | 29—149.5 |
| 2,891,302 | 6/1959 | Fuglie et al. | 29—149.5 |
| 2,965,958 | 12/1960 | Gribble | 29—257 X |
| 3,102,333 | 9/1963 | Thornton et al. | 29—257 |

FOREIGN PATENTS 2,881   7/1931   Australia.

WILLIAM FELDMAN, *Primary Examiner.*

MYRON C. KRUSE, *Examiner.*